United States Patent [19]

Boisdron et al.

[11] Patent Number: 5,673,091
[45] Date of Patent: Sep. 30, 1997

[54] LIQUID CRYSTAL DISPLAY DEVICE W/ PLURAL HOUSING ASSEMBLIES EDGES OVERLAP AND MAINTAIN CONSTANT PITCH BETWEEN PIXELS

[75] Inventors: Jean-Francois Boisdron, Paris; Michel Chaudagne, St. Denis, both of France

[73] Assignee: Souriau Diagnostic Electronique, Paray Vieille Poste, France

[21] Appl. No.: 501,079
[22] PCT Filed: Jan. 20, 1994
[86] PCT No.: PCT/FR94/00066
 § 371 Date: Oct. 13, 1995
 § 102(e) Date: Oct. 13, 1995
[87] PCT Pub. No.: WO94/18659
 PCT Pub. Date: Aug. 18, 1994

[30] Foreign Application Priority Data

Feb. 12, 1993 [FR] France .................................. 93 01589

[51] Int. Cl.⁶ ..................... G02F 1/133; G02F 1/1347; G02F 1/1333; G02F 1/1345
[52] U.S. Cl. ................. 348/58; 349/73; 349/74; 349/84; 349/152
[58] Field of Search ..................... 359/88, 83, 62; 349/58, 73, 74, 152

[56] References Cited

U.S. PATENT DOCUMENTS

| | | | |
|---|---|---|---|
| 3,846,015 | 11/1974 | Moi | 359/88 |
| 4,106,860 | 8/1978 | Kaufmann | 359/88 |
| 4,408,836 | 10/1983 | Kikuno | 350/334 |
| 4,917,466 | 4/1990 | Nakamura et al. | 359/62 |
| 5,519,524 | 5/1996 | Fergason et al. | 359/88 |

OTHER PUBLICATIONS

Patent Abstracts of Japan, vol. 8, No. 33, P-254 No. 58-189614 No Date.

*Primary Examiner*—William L. Sikes
*Assistant Examiner*—Julie Ngo
*Attorney, Agent, or Firm*—Bachman & LaPointe, P.C.

[57] ABSTRACT

The present invention concerns a liquid crystal display device consisting of a system of pixel elements. The display device includes an assembly of at least first and second display elements. The extremities of the display elements are overlapped so as to maintain a constant spacing between the pixel elements. Each display element includes two glass plates sealed together with a liquid crystal element between them.

8 Claims, 3 Drawing Sheets

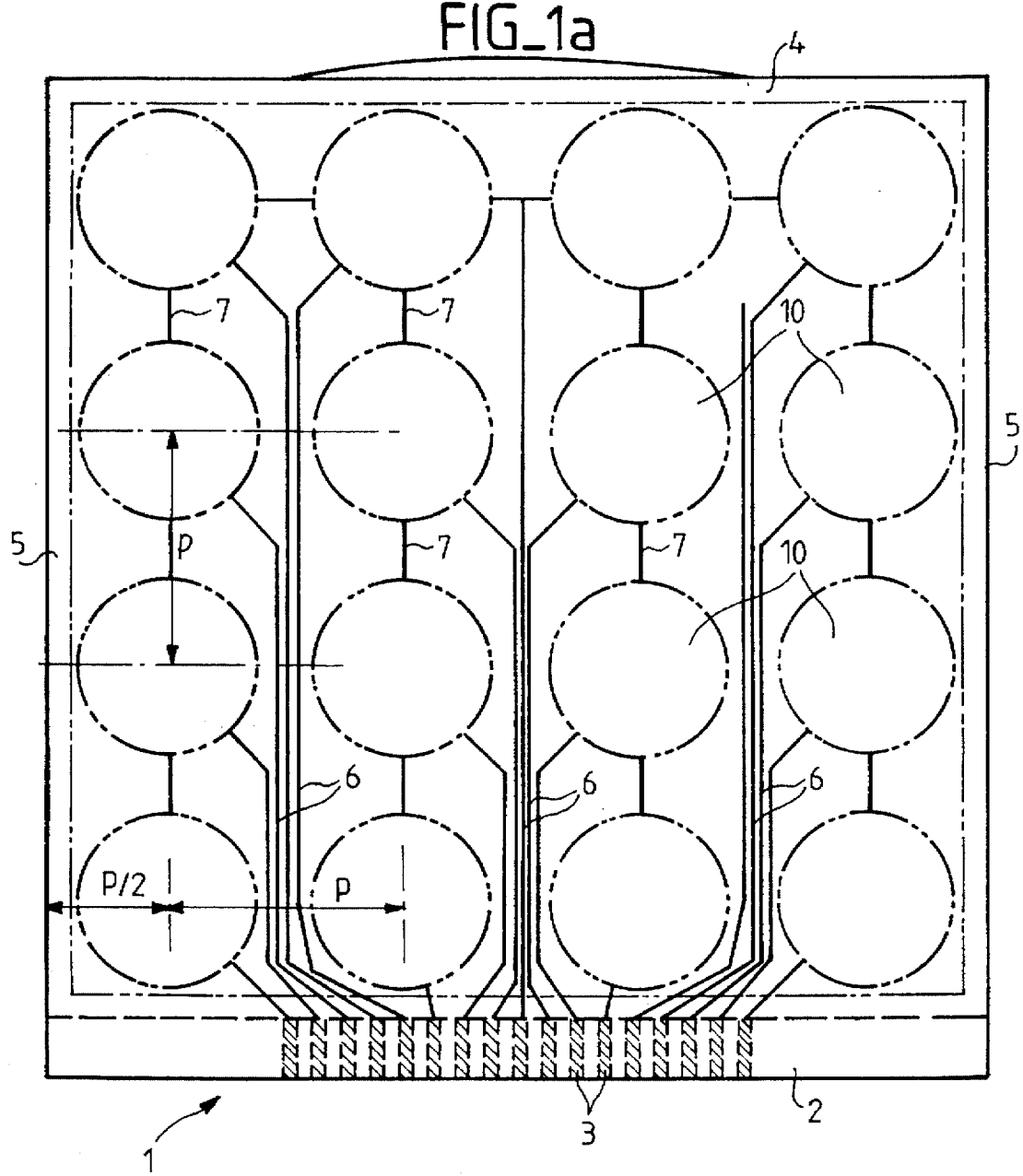
FIG_1a
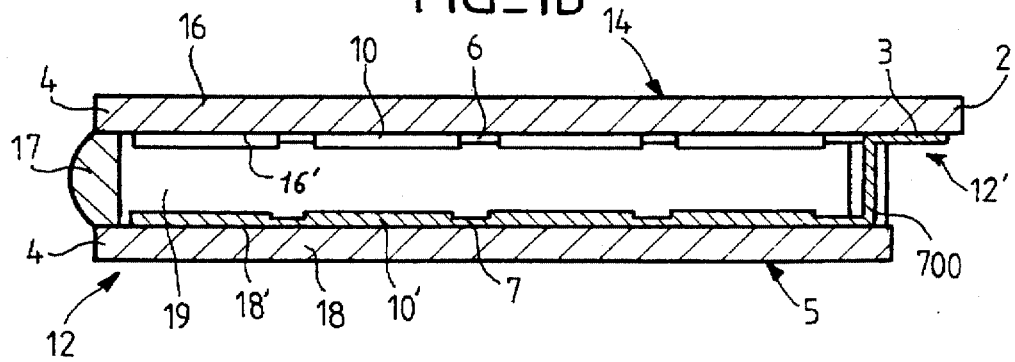
FIG_1b

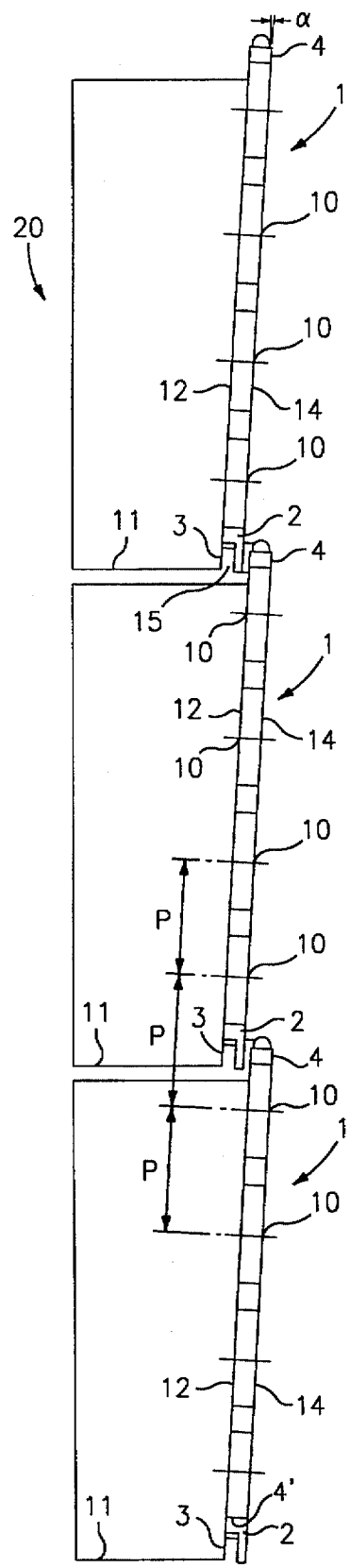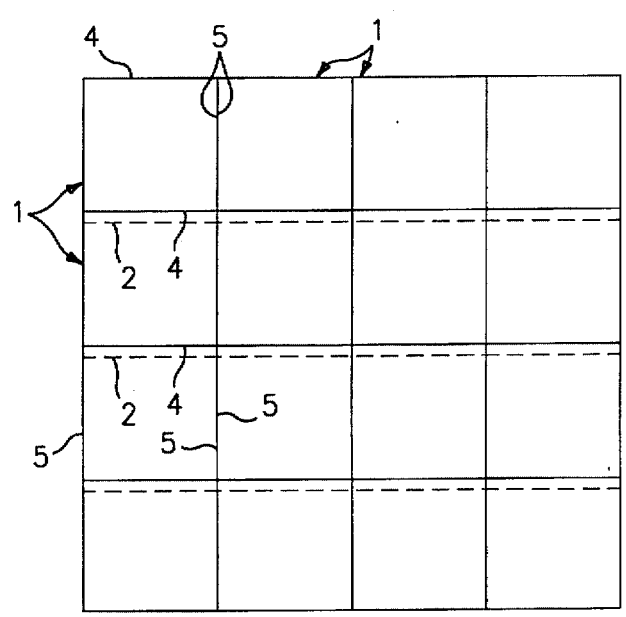
FIG_3
FIG_2

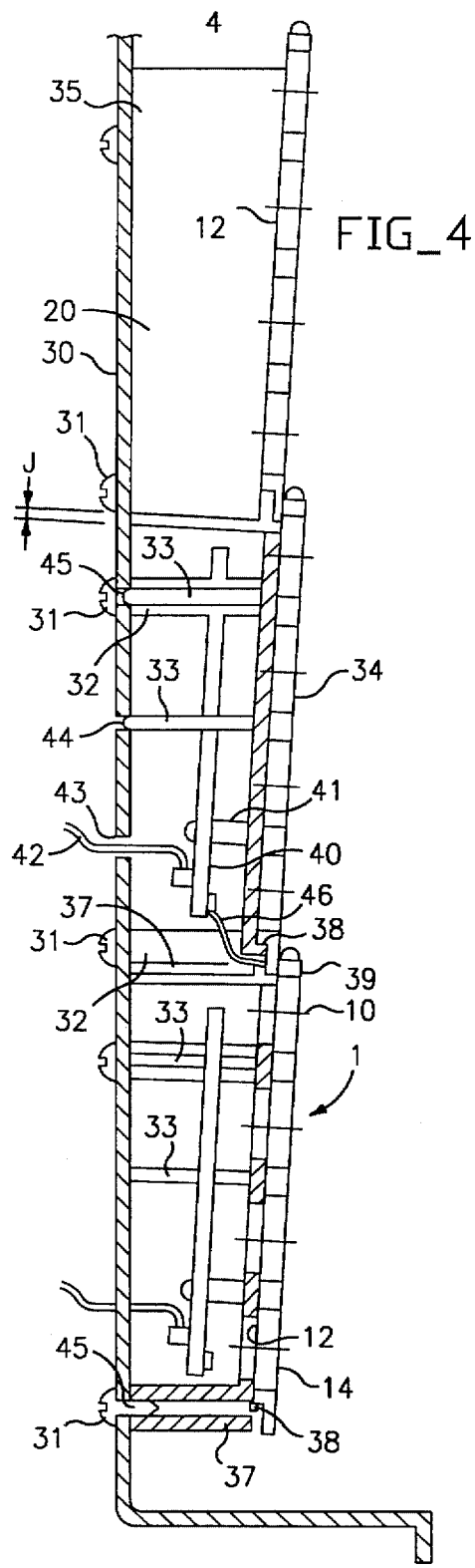
FIG_4
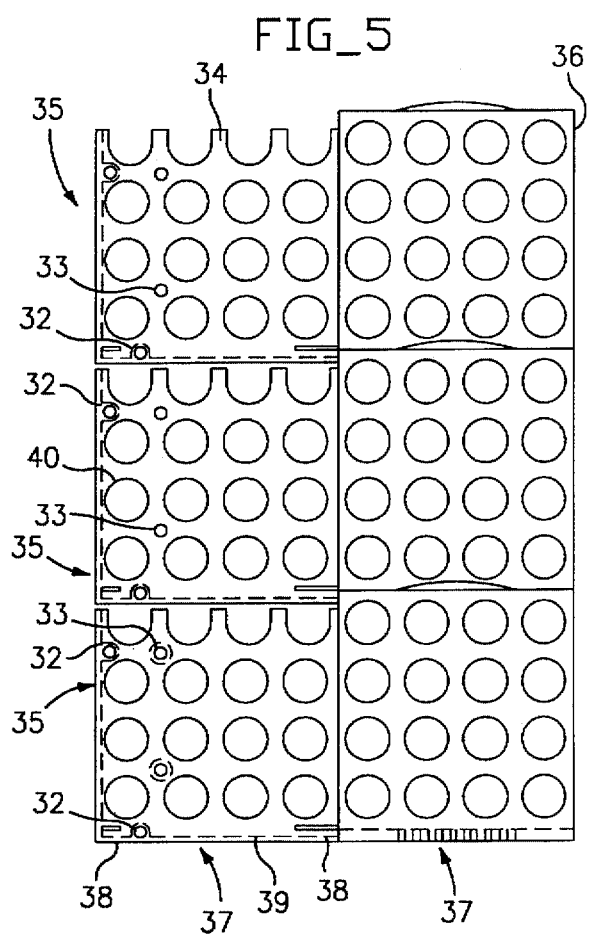
FIG_5

LIQUID CRYSTAL DISPLAY DEVICE W/ PLURAL HOUSING ASSEMBLIES EDGES OVERLAP AND MAINTAIN CONSTANT PITCH BETWEEN PIXELS

BACKGROUND OF THE INVENTION

The present invention concerns a liquid crystal display device comprising an array of pixels and including an assembly of at least first and second, elements each having a first face and a second face opposite the first face.

A device of this type is disclosed in French patent application No 2 656 451 filed 21 Dec. 1990 by the company MITSUBISHI.

This display device forms an array by edge-to-edge assembly of a plurality of liquid crystal panels. An electrode substrate comprising data bus lines and grid control bus lines is used to make the interconnections.

This device has a number of drawbacks including irregularities in the pitch of the pixels.

At present a strictly constant pitch between the pixels of an array liquid crystal display device can only be achieved by the use of a single element but in this case the maximal dimensions are limited to 300 mm by 400 mm due to limitations of the current technology.

Large liquid crystal display devices have been constructed from alphanumeric or mosaic modules assembled on X and Y axes to constitute a large alphanumeric display system. In these display systems there is virtually no perceptible irregularity of the pitch between the assembled alphanumeric modules.

U.S. Pat. No. 4,808,836 describes a display panel in which electrical continuity between LCD modules is achieved by contacts constituted by electrodes outside active display areas. Another object of this arrangement is to maintain a constant flatness between the modules (column 3—lines 3 through 13). This panel has the drawback that it cannot be used as a constant pitch graphics panel, mainly because it requires a mask.

At present there is no large display device using liquid crystals for applications in urban, railway station, airport, etc displays despite the obvious advantages of liquid crystals (in particular low power consumption and high reliability) as compared to the display devices known for such applications (including light-emitting diodes and electromagnetic display devices).

SUMMARY OF THE INVENTION

The invention therefore concerns a liquid crystal display device comprising an array of pixels which can be used to produce a large graphic display.

The display device of the invention is to this end characterized in that it comprises at least first and second display elements assembled together with an overlap between the ends of the elements so as to maintain a constant pitch between the pixels, said elements having an electrical connection first end including electric contacts disposed on a first face of said elements and a second end opposite the first end, the overlap being between the second end of the first face of the first element and the first end of the second face of the second element. By disposing the elements in the manner of roof tiles, it is possible to compensate the additional width due to the presence of an electrical connection area on one edge of the liquid crystal elements.

The first face of the device may include a rebate which extends it and which incorporates said electrical contacts.

Each element can be made in a manner that is known in itself in the form of two glass plates sealed together with a liquid crystal element trapped between them.

Each element can advantageously include an elementary matrix of pixels. The latter can be addressed electrically and either individually or in matrix-fashion.

In a preferred embodiment, the first ends of at least some of the elements are abutted against a corresponding lateral face of a housing.

The elements can advantageously be parallel to each other.

The display device of the invention may constitute a two-dimensional matrix of elements in which the elements overlap in one dimension and are disposed edge-to-edge in the other dimension. This leads to an assembly of the elements in the manner of roof tiles so that the pitch is always the same from one pixel to the next in the X direction and in the Y direction, both within the same element and on passing from one element to another in either direction.

The device of the invention can also be characterized in that the display elements are mounted in casings assembled together in a frame so as to have a clearance J in the overlap direction to enable demounting of a single housing by loosening two housings adjacent to it in said direction.

BRIEF DESCRIPTION OF THE DRAWINGS

The features and advantages of the invention will emerge more clearly from a reading of the following description given by way of non-limiting example with reference to the drawings, in which:

FIG. 1a is a top view of a prior art liquid crystal element;

FIG. 1b is a side view of an element of this kind, the gap between the glass plates being greatly exaggerated in order to clarify the drawings;

FIG. 2 is a side view of a preferred embodiment of the liquid crystal display device of the invention based on elements as shown in FIGS. 1a and 1b;

FIG. 3 is a diagrammatic top view of a display device as shown in FIG. 2;

FIG. 4 shows a preferred embodiment of a device of the kind shown in FIG. 2;

FIG. 5 is a top view of the device from FIG. 4.

DETAILED DESCRIPTION OF THE PREFERRED EMBODIMENT(S)

Referring to FIG. 1a, a liquid crystal element includes pixels 10 arranged in rows and columns (4 by 4 in this example) that are interconnected by row connections 6 and column connections 7. The connections 6 and 7 extend to a connector element carrying electrical contacts 3 disposed at one edge 2 of the element 1. This edge 2 is wider than the opposite edge 4 and the lateral edges 5 which do not carry electrical contacts.

Referring to FIG. 1b, a liquid crystal element includes two glass plates 16 and 18 about 1 mm thick and spaced apart a few microns by a peripheral epoxy resin seal 17 forming a spacer inside the perimeter of which is a liquid crystal element 19, the polarisation of which changes in accordance with the electric field to implement the aforementioned matrix. The electrical contacts 3 are on an extension 12' of the face 16' of the glass plate 16, projecting beyond the face 12 of the glass plate 18. The inside face 16' of the glass plate 16 carries N anodes 10 each having a conductive ink track 6' connected to one of the contacts 3. The inside face 18' of the glass plate 18 carries N cathode points 10' connected together by the conductive tracks 7' in turn connected to one of the contacts 3 by a flexible wire 700. In this version the pixels of the matrix defined by the anodes 10 are addressed one by one. Matrix-type addressing has also been used in the prior art.

Referring to FIGS. 2 and 3, the elements 1 are mounted to overlap one another in such a way as to maintain a constant pitch p between the pixels 10. The overlap is effected by superposing the face 12 of an element 1 at the end 4 to the face 14 of an adjacent element at the connection end 2. In the example shown, the end 2 of each element is abutted against a lateral rim 11 of a housing 20 which determines their position. The ends 2 are held by a lip 15 upstanding from the lateral rim 11. This roof tile arrangement introduces a slight parallax angle α which is not a significant problem in practice. Large screens of this kind are intended for overhead displays in cities or at railway stations or airports. Also, given that the angle is the same for all the elements, the elements remain parallel to each other.

FIGS. 2 and 3 show how the elements 1 overlap in one direction only, i.e. the elements 1 of the same column overlap whereas between columns the elements 1 are disposed edge-to-edge at their lateral edges 5. In this way the pitch p is preserved in both directions.

FIGS. 4 and 5 will now be described.

The housings are constituted by a top face 34 supporting two glass plate elements and three lateral walls (bottom wall 37, left wall 35 and right wall 36); they are mounted in a frame 30.

The top face has holes 40 through it to pass light for back-lighting each pixel. It has on the front face ribs 38 for locating the glass plates and on the rear face rods 33 for locating it on the frame 30 and spacers 41 for fixing the printed circuit carrying the display control components.

The lower lateral face has a cut-out 39 for a flexible circuit 46 connecting the glass plate to the printed circuit.

Spacers 32 for fixing the housings to the frame 30 extend from the top face of the housing and are part of the side walls.

The housing fixing frame 30 incorporates holes 45 for fixing the housings by means of screws 31, holes 44 for locating the housings and holes 43 for cables 42 connecting the display element control printed circuits to the electronics controlling the panel.

Referring to FIG. 4, the faces 12 of the elements 1 are fixed (for example glued) to the housings 20 which have a fixing device including spacers 32 and locating rods 33 for locating the housings 20 on the frame 30 by means of screws 31. The housings 20 are fixed to the frame one by one using the screws 31, starting with the top housing, the locating rods 33 maintaining the constant pitch p in the vertical direction. To demount them, in particular if one of the housings must be replaced, merely loosening the housings above and below it allows the housing to be replaced to be extracted by virtue of the clearance J between the housings. To enable such demounting, the clearance J corresponds to the size of the housings and is a function of the pitch p of the pixels 2. The clearance J is equal to half the length of the overlap between two display elements, for example.

We claim:

1. Liquid crystal display device comprising an array of pixels including an assembly of at least first and second display elements having a first face and a second face opposite the first face, characterized in that said assembly is such that ends of the elements overlap to maintain a constant pitch between the pixels, said elements having a first end incorporating electrical contacts disposed on the first face of said elements and a second end opposite the first end and in that the overlap is between the second end of the first face of the first element and the first end of the second face of the second element.

2. Device according to claim 1 characterized in that the first face of the device includes an extension which includes said electrical contacts.

3. Display device according to claim 1 characterized in that each element includes two glass plates sealed together and between which a liquid crystal element is trapped.

4. Display device according to claim 1 characterized in that each element includes an elementary matrix of pixels.

5. Display device according to claim 1 characterized in that the first ends of at least some of the elements are abutted against a corresponding lateral face of a housing.

6. Display device according to claim 1 characterized in that the elements are parallel to each other.

7. Display device according to claim 1 characterized in that said device constitutes a two-dimensional matrix of elements in which the elements overlap in one dimension and are disposed edge-to-edge in the other dimension.

8. Display device according to claim 1 characterized in that the display elements are mounted in housings assembled in a frame so as to have a clearance in an overlap direction to enable demounting of a single housing by loosening two housings adjacent to said single housing in said direction.

* * * * *